US 9,005,490 B2

(12) United States Patent
Jain et al.

(10) Patent No.: US 9,005,490 B2
(45) Date of Patent: Apr. 14, 2015

(54) MATERIAL FOR SOLID STATE SINTERED MATERIAL

(71) Applicant: Delphi Technologies, Inc., Troy, MI (US)

(72) Inventors: Kailash C. Jain, Troy, MI (US); Rick D. Kerr, Fenton, MI (US); Joseph M Keller, Grand Blanc, MI (US); Joseph V. Bonadies, Clarkson, MI (US)

(73) Assignee: Delphi Technologies, Inc., Troy, MI (US)

( * ) Notice: Subject to any disclaimer, the term of this patent is extended or adjusted under 35 U.S.C. 154(b) by 203 days.

(21) Appl. No.: 13/714,564

(22) Filed: Dec. 14, 2012

(65) Prior Publication Data

US 2014/0166941 A1    Jun. 19, 2014

(51) Int. Cl.

| | |
|---|---|
| H01B 1/08 | (2006.01) |
| C04B 35/26 | (2006.01) |
| C04B 38/00 | (2006.01) |
| H01M 4/86 | (2006.01) |
| C01G 51/00 | (2006.01) |
| H01M 4/88 | (2006.01) |
| H01M 8/10 | (2006.01) |
| C04B 111/00 | (2006.01) |

(52) U.S. Cl.
CPC .............. *H01M 4/8652* (2013.01); *C01G 51/68* (2013.01); *C04B 35/26* (2013.01); *C04B 35/2608* (2013.01); *C04B 35/2633* (2013.01); *C04B 35/2641* (2013.01); *C04B 38/00* (2013.01); *C04B 2111/00853* (2013.01); *C04B 2235/3208* (2013.01); *C04B 2235/3274* (2013.01); *H01M 4/8605* (2013.01); *H01M 4/8875* (2013.01); *H01M 8/1016* (2013.01); *C01P 2002/34* (2013.01); *C01P 2006/40* (2013.01)

(58) Field of Classification Search
CPC .......... H01B 1/08; H01B 1/122; C04B 35/26; C04B 38/00; B01J 2523/3706; B01J 20/043; H01M 4/9033
USPC .................. 252/518.1, 521.1, 521.2; 423/263
See application file for complete search history.

(56) References Cited

U.S. PATENT DOCUMENTS 5,922,486 A * 7/1999 Chiao ............................ 429/465
8,124,037 B2 * 2/2012 Jain et al. ...................... 423/263
(Continued)

FOREIGN PATENT DOCUMENTS

EP          1652829 A2    5/2006
EP          2333882 A2    6/2011
(Continued)

Primary Examiner — Mark Kopec
(74) Attorney, Agent, or Firm — James M. Chan

(57) ABSTRACT

A solid state sintered material is described that includes a mixed oxide of lanthanum, strontium, cobalt, iron and oxygen, and $CaCO_3$ inclusions. The solid state sintered material can also include calcium oxide, which can form from thermal composition of calcium carbonate. The solid state sintered material can also include a pore-forming particulate material such as carbon black and/or a doped ceramic metal oxide ionic conductor such as Sm-doped ceria uniformly dispersed in the solid state sintered material. The solid state sintered material can be formed from a two-step process in which a portion of the $CaCO_3$ is mixed with the mixed oxide materials and heated to form porous agglomerates, and the remaining $CaCO_3$ is added during the formation of a sintering paste. The solid state sintered material described herein can be used as a cathode material for solid oxide fuel cell.

9 Claims, 2 Drawing Sheets

(56) References Cited

U.S. PATENT DOCUMENTS

2004/0021240 A1 2/2004 Chen et al.
2010/0075194 A1* 3/2010 Jain et al. .................. 429/33

FOREIGN PATENT DOCUMENTS

| EP | 2452928 A1 | 5/2012 |
|----|------------|--------|
| JP | 2002 118012 A1 | 4/2002 |

* cited by examiner

MATERIAL FOR SOLID STATE SINTERED MATERIAL

STATEMENT REGARDING GOVERNMENT SUPPORT

This invention was made with Government support under DE-FC26-02NT41246 awarded by DOE. The Government has certain rights in this invention.

BACKGROUND OF THE INVENTION

Fuel cells for combining hydrogen and oxygen to produce electricity are well known. One known class of fuel cells is referred to as solid oxide fuel cells (SOFC's). An SOFC generally consists of a cathode and an anode physically separated by a solid oxide electrolyte, and electrically connected by an external electrical circuit. During operation of an SOFC, oxygen is provided to the cathode of the cell while hydrogen-containing fuel is provided to the anode. Oxygen is catalytically reduced at and diffuses through the cathode to reach the solid electrolyte. The solid electrolyte is permeable to the oxygen anions, which diffuse across the electrolyte to the anode where they combine with hydrogen to form water and release electrons, which flow through the external circuit to the cathode to provide the source of electrons for the catalytic reduction of oxygen, thereby generating electricity.

The cathode of an SOFC must satisfy a combination of criteria, including but not limited to catalytic activity, electrical conductivity (both ionic and electronic conductivity), electronic structure, stability, structural integrity, thermal expansion, and the like, all at operating conditions such as high temperatures in excess of 800° C. A class of materials that have used for SOFC cathode applications is the mixed ionic and electronic conducting (MIEC) materials such as perovskite-type $ABO_3$ oxides. The general chemical formula for perovskite compounds is $ABX_3$, wherein 'A' and 'B' are two cations of very different sizes, and X is an anion that bonds to both. The native titanium mineral perovskite itself is of the formula $CaTiO_3$. The 'A' atoms are larger than the 'B' atoms. The ideal cubic-symmetry structure has the B cation in 6-fold coordination, surrounded by an octahedron of anions, and the A cation in 12-fold cuboctahedral coordination. The relative ion size requirements for stability of the cubic structure are quite stringent, so slight buckling and distortion can produce several lower-symmetry distorted versions, in which the coordination numbers of A cations, B cations, or both are reduced.

Mixed oxide materials comprising lanthanum (La), strontium (Sr), cobalt (Co), and iron (Fe), also known as "LSCF", of have been proposed in the prior art as materials for SOFC cathodes due to their high catalytic activity for the oxygen exchange reaction and a high electronic conductivity for current collection. One proposed formulation is characterized by the general formula $La_{1-x}Sr_xCo_{1-y}Fe_yO_{3-\delta}$. The physical and chemical properties of this class of materials, such as electrical conductivity, electronic structure, catalytic activity, stability, and thermal expansion coefficient ("TEC"), have been studied in detail. Generally, electronic and ionic conductivities and catalytic activity are enhanced with increasing values of x and decreasing values of y, whereas there is an opposite tendency for chemical stability.

Although many of the materials proposed for SOFC cathodes have been effective to varying degrees, alternative materials that offer better performance, reliability, cost, or combination of these or other parameters.

SUMMARY OF THE INVENTION

These and other advantages and features will become more apparent from the following description taken in conjunction with the drawings.

As described in further detail below, a solid state sintered material comprises a mixed oxide comprising lanthanum, strontium, cobalt, iron and oxygen, and inclusions comprising calcium carbonate. In some exemplary embodiments, the solid state sintered material also includes calcium oxide, which can form from thermal composition of calcium carbonate. In some embodiments, the solid state sintered material includes a pore-forming particulate material such as carbon black. In some embodiments, the solid state sintered material further comprises a doped ceramic metal oxide such as Sm-doped ceria, which can be uniformly dispersed in the solid state sintered material. The solid state sintered material described herein can be used as a cathode material for solid oxide fuel cell.

The solid state LSCF material carbonate can be prepared by:

(1) forming a mixture comprising calcium carbonate and a mixed oxide comprising lanthanum, strontium, cobalt, and iron;
(2) milling and drying the mixture from (1);
(3) heating the dried mixture from (2) to form porous agglomerates;
(4) forming a paste comprising an organic binder, the porous agglomerates from (3), and additional calcium carbonate; and
(4) sintering the paste from (4) under pressure and temperature conditions to cause solid state sintering.

In some embodiments, the mixture in (1) and/or the mixture in (4) can also include added pore-forming material such as carbon black. In some embodiments, the mixture in (1) and/or the mixture in (4) can include an added doped ceramic metal oxide ionic conductor such as Sm-doped ceria.

BRIEF DESCRIPTION OF THE DRAWINGS

The foregoing and other features, and advantages of the invention are described in the following detailed description taken in conjunction with the accompanying drawings in which.

DETAILED DESCRIPTION

The solid state sintered material described herein can be prepared by mixing powders of metal salts and/or oxides in the appropriate amounts to provide the desired ratio of the various elemental components of the desired mixed oxide comprising lanthanum, strontium, cobalt, iron, and oxygen. Exemplary salts or oxides include $La_2O_3$, $SrCO_3$, $CoCO_3$, and $Fe_2O_3$ as starting materials for the mixed oxide.

Mixing of the metal oxide and/or salt powders can be accomplished by known metal/oxide powder mixing techniques such as ball milling in solvent. Starting particle sizes can vary widely depending on supplier specifications, and final particle sizes of the mixture after milling can range from 0.5 µm to 5.0 µm, more specifically about 1.0 µm $d_{50}$ mean particle size being typical. Milling times can range from 0.5 to 20 hours, more specifically about 6 hours. After milling and drying the resulting mixture comprising metal oxide and/or salt powder can be calcined (e.g., at 1150° C. to 1300° C. for 20 to 10 hours) to promote the formation of LSCF crystal structures such as the LSCF 6428 crystal structure, followed by additional milling to produce an LSCF powder.

Figure 1:
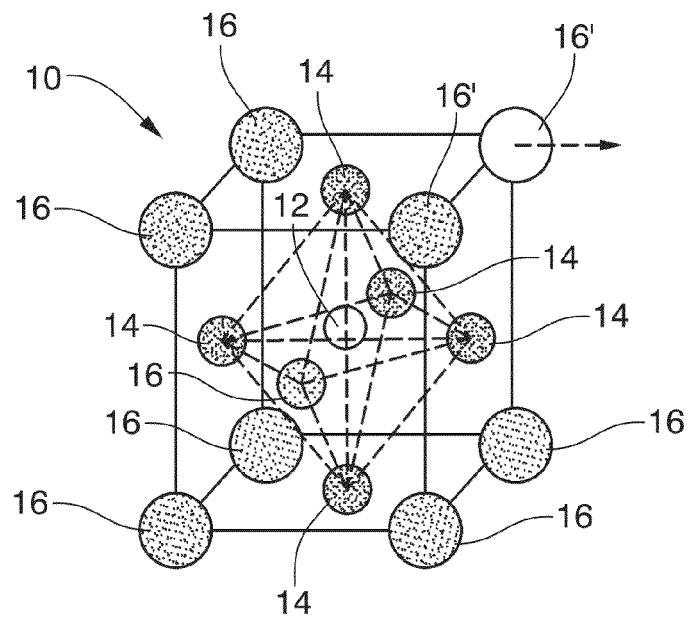
FIG. 1 depicts a perovskite crystal structure.

LSCF 6428 materials can be characterized by the formation of perovskite crystal structures of the type that tend to form from tend to form from the mixture having the elements in the ratio $La_{0.6}Sr_{0.4}Co_{0.2}Fe_{0.8}O_{3-\delta}$, where $\delta$ is 0-0.2. An exemplary perovskite crystal structure is depicted in FIG. 1, where a perovskite lattice structure 10 comprises a central B-site cation 12 surrounded by a square double pyramid lattice of six oxygen ions 14 in turn surrounded by a cubic lattice of eight A-site cations 16. LSCF 6428 materials comprise perovskite crystal structures where the A-sites are occupied by La and Sr ions, and the B-sites are occupied by Co and Fe ions that surround oxygen ions 14.

As known in the art, the mixture from which an LSCF 6428 material is formed is not required to precisely match the 6:4:2:8 molar ratio of La:Sr:Co:Fe, and it is known in the art to modify the ratio of components so that some of the A-sites, such as site 16', which would otherwise hold an La or Sr ions, are left vacant. Various compositions such as $La_{1-x}Sr_xCo_{1-y}Fe_yO_{3-\delta}$ or $(La_{0.6}Sr_{0.4})_{1-z}Co_{0.2}Fe_{0.8+b}O_{3-\delta}$, have been proposed as a mixed ionic and electronic conducting ("MIEC") material for use as or in a solid oxide fuel cell cathode. Other LSCF materials of the 6428 type are disclosed in US pat. app. publ. no. 2011/0143255 A1, the disclosure of which is incorporated herein by reference in its entirety. Such LSCF 6428 materials can be characterized by the formula $La_{1-x-2z}Sr_{x+z}Co_{0.2+a}Fe_{0.8+b}O_{3-\delta}$, where x can equal 0.4, z can be 0 to 0.1, a can be 0.01 to 0.04, and b can be 0.05 to 0.15.

Calcium carbonate, as the source for the inclusions comprising calcium carbonate in the solid state sintered material, can be incorporated in the mixture during the milling of the metal oxide and/or salt powders, and/or during post-calcining milling of the LSCF material. Calcium carbonate starting particle sizes can vary depending on factors such as the milling protocol, and can generally range from 50 µm to 20 µm. As calcium carbonate tends to thermally decompose to calcium oxide under calcining conditions, incorporation of calcium carbonate during post-calcining milling of the LSCF material avoids subjecting it to the first calcining, and can thereby provide more significant amounts of residual calcium carbonate in the inclusions and/or provide larger inclusions in the solid state sintered material. Calcium carbonate can be included in the final composition in amounts of from 0.5 wt. % to 10 wt. %, more specifically from 2-6 wt. %.

The solid state materials comprising lanthanum, strontium, cobalt, and iron can also include other materials such as ionic conductors as a mechanical mixture, which can promote the ionic conducting of the composite cathode in the final solid state material. Exemplary doped ceramic metal oxides include ceria doped with $Y_2O_3$, $Gd_2O_3$, $Nd_2O_3$, $Sm_2O_3$ or $Yb_2O_3$. In more specific embodiments, the doped ceramic metal oxide can be Sm-doped ceria such as $Ce_{0.8}Sm_{0.2}O_3$. Ionic conductors like doped ceramic metal oxides can be included in an amount of from 0 wt. % to 60 wt. %, more specifically from 25 wt. % to 50 wt. %, of the amount of the LSCF mixed oxide [see discussion. The doping level may be about 3 mole % to about 30 mole %, more specifically about 10 mole % to about 20 mole %. The amount of ionic conducting phase in the MIEC material may be varied from about 0 wt % to about 60 wt %, more specifically about 25 wt % to about 50 wt %. In some embodiments, an SOFC cathode will include a layer or segments comprising LSCF and an ionic conductor like samaria-doped ceria (SDC), also referred to an SDCF layer or segment, which have mixed ionic and electronic conductivity with a higher level of ionic conductivity than other portions of the electrode formed from LSCF without the ionic conductor. In other embodiments, presence of the $CaCO_3$ material and its decomposition product CaO can allow for the ionic conductor (e.g., SDC) to be uniformly dispersed in the solid state sintered material, which provides for reduced complexity of manufacturing.

The mixtures out of which the solid state LSCF materials are formed can also include a pore former. The purpose of a pore former is to enable the formation of low resistance gas diffusion paths. Pore formers are materials that decompose to leave the desired porosity in the sintered layer. For example, carbon black, flour, starch, non-soluble organics such as poly (methyl methacrylate), or mixtures comprising any of the foregoing, can be used as pore formers. The amount of pore formers may vary from about 0 wt % to about 100 wt % of the solid phase or even higher, more specifically from 10 wt % to 50 wt %.

Solid state LSCF materials can be prepared by sintering techniques where powdered LSCF material is mixed with resin binder to form a paste, which is then deposited onto a substrate like an anode-supported electrolyte and sintered under conditions conducive to solid state sintering. Solid state sintering well-known in the art and is characterized by grain growth that occurs in so-called "neck regions", i.e., interstitial spaces between grains of the material being sintered are filled with new crystals or grain growth from atoms that have diffused from the initial grains to the neck regions. This growth of new material in the neck regions between the grains transforms the individual grains into a solid state cohesive material. Of course, a certain degree of porosity is needed in order for oxygen to be able to diffuse through an SOFC cathode, so solid state sintering is typically controlled to limit the amount of grain growth into the neck regions of the material in order to provide desired physical and electrical properties while maintaining desired levels of porosity. Conditions conducive to solid state sintering of LSCF materials can include 900° C. to 1050° C. for 0.5-6 hours.

The solid state LSCF material having inclusions comprising calcium carbonate can be prepared by:
(1) forming a mixture comprising calcium carbonate and a mixed oxide comprising lanthanum, strontium, cobalt, and iron;
(2) milling and drying the mixture from (1);
(3) heating the dried mixture from (2) to form porous agglomerates;
(4) forming a paste comprising an organic binder, the porous agglomerates from (3), and additional calcium carbonate; and
(4) sintering the paste from (4) under pressure and temperature conditions to cause solid state sintering.

The above-described method involves adding the calcium carbonate in two portions: a first portion in (1) and a second portion in (4). In some embodiments of this method, from 30-70 wt. %, more specifically from 40-60 wt. %, and even more specifically about 50 wt. % of the total amount of calcium carbonate to be used in the solid state material is milled in solvent with the LSCF material. More specifically, the mixture in (1) can comprise from 0.1 wt. % to 5 wt. %, more specifically from 2 wt. % to 4.5 wt. %, and even more specifically from 3 wt. % to 4 wt. % of calcium carbonate. In some embodiments, the mixture in (1) can include a pore former, which can be present in amounts of 0.5 wt. % to 20 wt. %, more specifically from 2 wt. % to 10 wt. %, and even more specifically from 4 wt. % to 8 wt. % of the mixture.

In some embodiments, the mixture in (1) further comprises a doped ceramic metal oxide ionic conductor. The doped ceramic metal oxide can be incorporated into the mixture in (1) in the form of a material that is prepared by mechanically mixing (e.g., by ball milling in solvent) the metal oxide and/or salt components used to make an LSCF material with a doped ceramic metal oxide ionic conductor (e.g., SDC). In these embodiments, the mixture in (1) would comprise an LSCF material and a composite material such as SDCF containing LSCF and a doped ceramic metal oxide ionic conductor. Such a composite material can comprise from 50-80 wt. % of LSCF, more specifically from 65-75 wt. %, and even more specifically about 70 wt. %, with the balance being an ionic conductor like SDC. Alternatively, the doped ceramic metal oxide ionic conductor can be incorporated during the preparation of the LSCF material, in which case the mixture in (1) would be all SDCF (plus $CaCO_3$ and any pore former or other additives), but with a lower amount of ionic conductor (compared to SDCF that is mixed with LSCF) to achieve the same target amount of ionic conductor in the final material. Overall levels of doped ceramic metal oxide ionic conductor in the solid state material can range from 0-60 wt.%, more specifically from 25-50 wt.%, and even more specifically from 30-35 wt.%.

The mixture formed in (1) according to the above-described method is is milled (e.g., 0.5 to 20 hours) and then dried and heated, typically in air to form porous agglomerates. Heating temperatures can range from 400° C. to 1100° C., more specifically from 600° C. to 900° C., and even more specifically about 750° C. Heating times can range from 30 minutes to 2 hours, more specifically from 45 minutes to 1.5 hours, and even more specifically about 1 hour. This heating procedure to create porous agglomerates helps optimize ionic conductivity and oxygen bulk diffusion, along with surface exchange coefficients of the material.

After heating to form the porous agglomerates, the porous agglomerate material is mixed with additional calcium carbonate, an organic binder, and optionally additional pore former to form a pre-sintering paste. The amount of calcium carbonate added in this stage of the process can range from 0.1 wt. % to 5 wt. %, more specifically from 2 wt. % to 4.5 wt. %, and even more specifically from 3 wt. % to 4 wt. % of calcium carbonate. In some embodiments, the mixture in (4) can include additional pore former, which can be present in amounts of 0.5 wt. % to 20 wt. %, more specifically from 2 wt. % to 10 wt. %, and even more specifically from 4 wt. % to 8 wt. % of the mixture. The resin can be any of the known types for making pre-sintering pastes, including polyvinylbutryal, ethylcellulose, or acrylic, and is typically present in an amount of 7-14 wt. %, more specifically 8-12 wt. %, and even more specifically about 10 wt. %, based on the total weight of the binder vehicle used for making the paste (solids 60 wt. %).

The paste is then deposited on a suitable support such as an anode-supported solid electrolyte and sintered (e.g., at 1050° C.) to form the solid state material over a doped ceria-containing SDCF layer. As discussed above, sintering conditions are set to promote solid state sintering while producing a microstructure with a desired surface area to volume ratio, porosity, and path tortuosity for oxygen diffusion. The sintering time at the peak temperature can range from 0.5 hours to 6 hours, and can be adjusted to optimize the pore size around the calcite particle. The resulting material can have total porosity of about 20-25% distributed between fine pores and large pores around the $CaCO_3$ inclusions. Although the operation of the present invention is not bound by any particular theory, it is believed that the $CaCO_3$ during sintering partially decomposes to CaO, wets the surfaces of LSCF, SDCF, and pore walls, assists in the oxygen reaction occurring at the cathode, and reduces tortuosity of the cathode by creating large pores and thus works as an electrochemical sintering aid. It does not promote densification of LSCF, form other phases, or reduce its electronic conductivity. The pore former (e.g., carbon black) is also believed to assist in achieving a cathode with high surface area/volume with low tortuosity gas diffusion paths.

The invention is further described below in the following non-limiting example(s).

EXAMPLES

Figure 2:
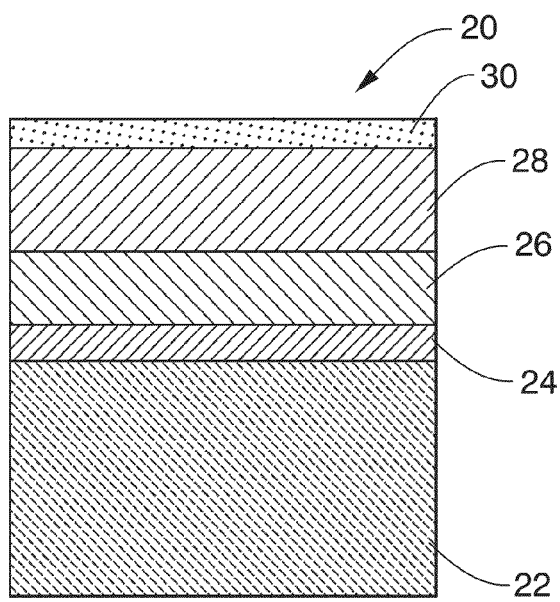
FIG. 2 schematically illustrates an exemplary solid oxide fuel cell configuration as described herein.

A uniformly mixed SOFC cathode material was obtained by milling 63 g LSCF, 27 g SDCF (LSCF doped with 27 wt. % of SDC, 6.5 g carbon black, and 3.5 g $CaCO_3$ in ethanol using zirconia media (4 mm) for 6 hours. The milled material was then collected and dried. The milled material was then heated in air at 750° C. for 1 hour to create porous agglomerates. Next 90 g of the resulting porous LSCF/SDCF/$CaCO_3$ agglomerated mix material, 6.5 g of carbon black, and 3.5 g of $CaCO_3$ were added and a 70% solids paste was prepared using an organic binder vehicle. This material was used in the preparation of an SOFC as shown in FIG. 2. As shown in FIG. 2, solid oxide fuel cell 20 has Ni-YSZ anode support 22 disposed on one side of YSZ electrolyte 24. On the other side of YSZ electrolyte 24 is disposed, in order, a porous SDCF layer 26, a layer 28 of the mixed LSCF/SDCF/$CaO_3$/carbon black paste described above, and a silver-palladium current collector layer 30. Compared to some prior art cells utilizing MIEC' s enhanced with an ionic conductor, the single layer 28 is used in place of two separate layers of a LSCF/SDCF mix layer and an LSCF layer, thus significantly simplifying the manufacturing process.

Figure 3:
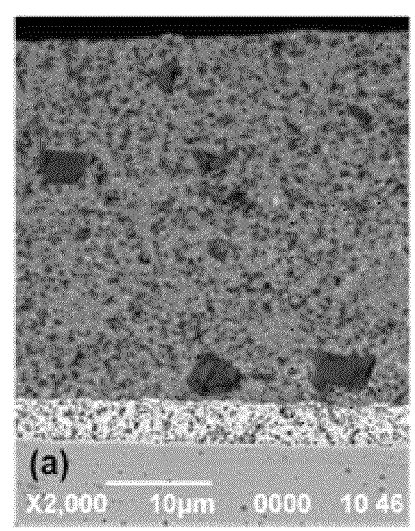
FIG. 3 depicts a photomicrograph of an exemplary solid state material as described herein.

On two 1" diameter substrates labeled as cell (g) and cell (g') with 12 micron thick YSZ electrolyte supported on a 0.45 mm Ni/YSZ anode, a 5 µm thick layer of an SDCF layer and a 30 µm thick of the mixed LSCF/SDCF/$CaO_3$/carbon black paste described above were screen printed, dried, and sintered at 1050° C. for 1.5 hour to form a cathode. The resulting structure and materials are typified by the micrograph shown in FIG. 3, which shows the YSZ electrolyte as the lower-most layer, the SDCF layer above the YSZ electrolyte, and the mixed LSCF/SDCF/$CaO_3$/carbon black layer as the upper-most layer. Next, a noble metal layer of Ag—Pd was screen printed onto the cathode and sintered at 1000° C. to form a current collector. Next, silver and nickel meshes with platinum lead wires and pastes were attached to measure the cell performance. Finally onto cell (g') a 1 molar solution of $Sm_{0.5}Sr_{0.5}CoO_3$ using corresponding nitrate precursors was prepared and dispensed on the 2.5 $cm^2$ cathode surface to further improve the power performance. This amount of solution dripped onto the cathode, after drying at 110° C. to 400° C. for sufficient time (e.g., 5 to 30 minutes) results in about a 7-10 mg increase in the mass of the cell. Alternatively, Pd or any other electro-catalyst ($La_{0.6}Sr_{0.4}CoO_{3-\delta}$ ("LSCO"), $SrCo_{0.8}Fe_{0.2}O_{3-\delta}$ ("SCF")), and LSCF) can be dripped and dried to impregnate the cathode and improve the power performance by enhancing the oxygen reduction reaction.

Figure 4:
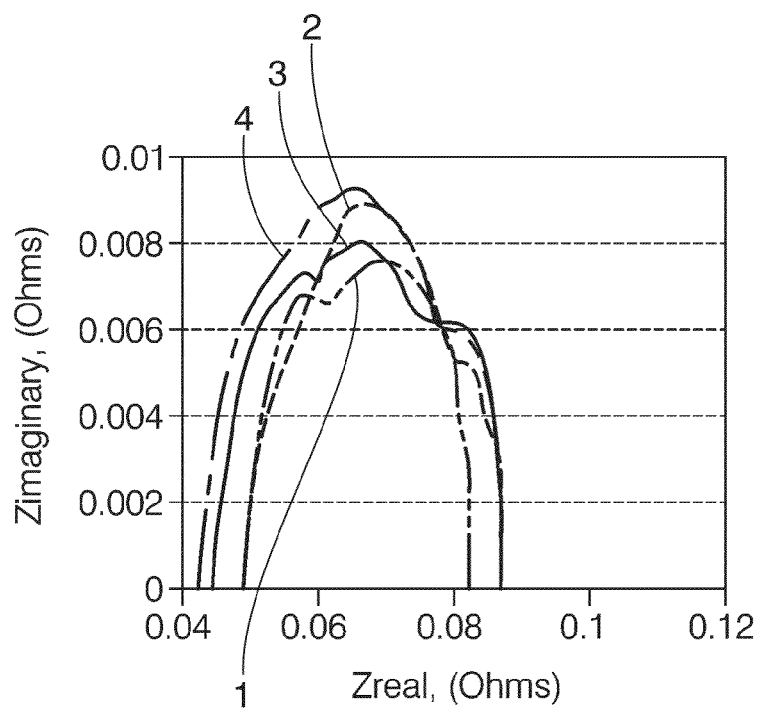
FIG. 4 is an impedance plot of a solid oxide fuel cell prepared as described herein.
Figure 5:
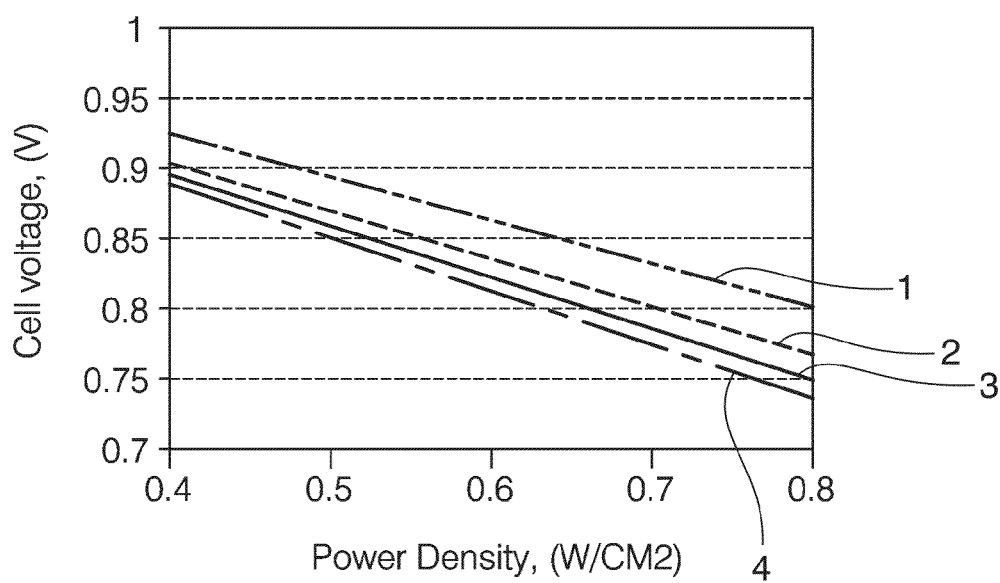
FIG. 5 is a plot of power density versus cell voltage of a solid oxide fuel cell prepared as described herein.

For measuring the power performance, the air and fuel sides of the cells were isolated using a glass sealing material. The NiO/YSZ composite anode was reduced, in situ, at 800° C. for 1 hour in a hydrogen gas atmosphere (50% $H_2$ in $N_2$). The cathode side of the cell was exposed to flowing air at a rate of 2.3 liters/min and the anode side was exposed to a flowing stream of 50% hydrogen at a rate of 2.3 liters/min. The electrochemical measurements were conducted using a potentiostat/galvanostat (Parstat® 2273), and power-generating characteristics at 750° C. in 50% $H_2$ in $N_2$ at 0.8 V polarization potential as a function of time were measured. The results are shown in FIGS. 4 and 5. Cell g″ was prepared for comparison purposes in similar as described above, but with all ingredients combined in a single step instead of adding part of the $CaO_3$ and pore former in a second stage. A control cell was prepared in similar fashion as described above, but without any $CaO_3$. Impedance of the cells at 0.8 V is shown in FIG. 4, and power density versus cell voltage is shown in FIG. 5. In FIGS. 4 and 5, plot line 1 represents cell g, plot line 2 represents cell g′, plot line 3 represents cell g″, and plot line 4 represents the control cell. The cells g and g′ exhibit reduced impedance compared to the g″ and control cells, and also exhibit 12% and 25% improvements in power density, respectively. Part of the reduction in cell impedance is believed to be due to the improved microstructure (cell g & g′) itself and the remainder is believed to be due to improved electrode oxygen reaction due to a thin physical coating of CaO and high conductivity electrocatalytic phase on electrode surfaces and pores. These factors can help provide reduced non-charge and charge transfer resistances at 750° C. in 50% $H_2$ in $N_2$ and 0.8V polarization and, as shown in FIG. 5, cells g′ and g achieve 12% and 25% improvement in the power density, respectively.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A method of making a solid state sintered material, comprising:
   (1) forming a mixture comprising calcium carbonate and a mixed oxide comprising lanthanum, strontium, cobalt, and iron;
   (2) milling and drying the mixture from (1);
   (3) heating the dried mixture from (2) to form porous agglomerates;
   (4) forming a paste comprising an organic binder, the porous agglomerates from (3), and additional calcium carbonate; and
   (5) sintering the paste from (4) under pressure and temperature conditions to cause solid state sintering.

2. The method of claim 1, wherein the mixture from (1) further comprises a pore-forming material.

3. The method of claim 2, wherein said pore-forming material comprises carbon black, flour, starch, poly(methyl methacrylate), or mixtures comprising any of the foregoing.

4. The method of claim 2, wherein the paste from (4) further comprises additional pore-forming material.

5. The method of claim 1, wherein the paste from (4) further comprises a pore-forming material.

6. The method of claim 1, wherein the mixture in (1) further comprises a doped ceramic metal oxide ionic conductor.

7. The method of claim 6, wherein the doped ceramic metal oxide comprises ceria doped with $Y_2O_3$, $Gd_2O_3$, $Nd_2O_3$, $Sm_2O_3$, or $Yb_2O_3$.

8. The method of claim 6, wherein the doped metal oxide is according to the formula $Ce_{0.8}Sm_{0.2}O_3$.

9. The method of claim 1, wherein the sintering in (4) is performed under a temperature of 900° C. to 1070° C. for 0.5 to 6 hours.

* * * * *